United States Patent
Guo et al.

(10) Patent No.: US 10,740,161 B2
(45) Date of Patent: Aug. 11, 2020

(54) BROADCAST MESSAGE SENDING METHOD AND APPARATUS, AND MOBILE TERMINAL

(71) Applicant: ZTE CORPORATION, Shenzhen, Guangdong Province (CN)

(72) Inventors: Haijing Guo, Shenzhen (CN); Jianfei Yu, Shenzhen (CN)

(73) Assignee: ZTE CORPORATION (CN)

( * ) Notice: Subject to any disclaimer, the term of this patent is extended or adjusted under 35 U.S.C. 154(b) by 21 days.

(21) Appl. No.: 16/079,081

(22) PCT Filed: Jun. 14, 2016

(86) PCT No.: PCT/CN2016/085730
§ 371 (c)(1),
(2) Date: Aug. 22, 2018

(87) PCT Pub. No.: WO2017/173728
PCT Pub. Date: Oct. 12, 2017

(65) Prior Publication Data
US 2020/0019449 A1    Jan. 16, 2020

(30) Foreign Application Priority Data
Apr. 7, 2016   (CN) .......................... 2016 1 0212438

(51) Int. Cl.
*G06F 9/54* (2006.01)
(52) U.S. Cl.
CPC .............. *G06F 9/542* (2013.01); *G06F 9/546* (2013.01); *G06F 2209/548* (2013.01)

(58) Field of Classification Search
None
See application file for complete search history.

(56) References Cited

U.S. PATENT DOCUMENTS

2015/0381514 A1* 12/2015 Word ................... H04L 47/6295
                                                                 709/203
2018/0145871 A1* 5/2018 Golin ...................... H04L 51/28

FOREIGN PATENT DOCUMENTS

| CN | 101222436 A | 7/2008 |
|----|-------------|--------|
| CN | 101222436 A | 7/2008 |
| CN | 102014052 A | 4/2011 |
| CN | 102999386 A | 3/2013 |
| CN | 104994481 A | 10/2015 |
| WO | WO2004045120 A1 | 5/2004 |

* cited by examiner

*Primary Examiner* — Umut Onat
(74) *Attorney, Agent, or Firm* — McDonald Hopkins LLC

(57) ABSTRACT

A broadcast message sending method and apparatus, and a mobile terminal is provided. The method includes: setting at least three broadcast queues in a system; putting a new broadcast message into one queue of the at least three broadcast queues according to a requirement for a response speed of each broadcast message and/or a service logic relationship between broadcast messages; sending broadcast messages in respective queues through the at least three broadcast queues.

12 Claims, 1 Drawing Sheet

BROADCAST MESSAGE SENDING METHOD AND APPARATUS, AND MOBILE TERMINAL

CROSS-REFERENCE TO RELATED APPLICATIONS

The present application is a U.S. National Phase Entry of International PCT Application No. PCT/CN2016/085730 having an international filing date of Jun. 14, 2016, which claims priority to Chinese Patent Application No. 201610212438.5 filed on Apr. 4, 2016. The present application claims priority and the benefit of the above-identified applications and the above-identified applications are incorporated by reference herein in their entirety.

TECHNICAL FIELD

The present application relates to, but not limited to, the communication technology field, and more particularly to a broadcast message sending method and apparatus, and a mobile terminal.

BACKGROUND

In an ANDROID system, a broadcast mechanism may be used for data broadcasting between components.

Broadcast includes a system broadcast sent by the system and a broadcast customized by an application. The system broadcast, for example, may include a broadcast sent when the initiation of the system is finished, a broadcast sent when the screen is on, a broadcast sent when the screen is off, a broadcast sent when the lock screen is unlocked successfully, and so on. The sending for all above broadcasts is managed uniformly by the ANDROID system. The system puts broadcasts to be sent into a broadcast queue. As long as the queue is not empty, the broadcast messages waiting to be sent in the queue will be sent in sequence according to a first-in first-out rule.

The reception of the broadcast is based on a register manner. The system and the application both can be registered as a receiver of a certain broadcast, and one broadcast may have multiple receivers. When a certain broadcast is sent, the system sends the broadcast to all of the receivers in sequence, and after each receiver completes related operations, the system sends a next broadcast. Therefore, if there are relatively more broadcasts waiting to be sent in the broadcast queue or there are relatively more receivers of broadcast waiting to be sent in the broadcast queue, then the time from a point of sending a broadcast to a point that all the receivers receive the broadcast and complete the related processing is relatively long, causing message sending lag and poor user experience.

SUMMARY

The following is an overview of the subject matter described in detail herein. This summary is not intended to limit the protection scope of the claims.

Embodiments of the present disclosure provide a broadcast message sending method and apparatus, and a mobile terminal, to solve the problems in the existing art of broadcast message sending lag and poor user experience.

In one aspect, an embodiment of the present disclosure provides a broadcast message sending method, including: setting at least three broadcast queues in a system; putting a new broadcast message into one queue of the at least three broadcast queues according to a requirement for a response speed of each broadcast message and/or a service logic relationship between broadcast messages; sending broadcast messages in respective queues through the at least three broadcast queues.

In an exemplary embodiment, putting a new broadcast message into one queue of the at least three broadcast queues according to a requirement for a response speed of each broadcast message and/or a service logic relationship between broadcast messages includes: when the new broadcast message is a screen-on broadcast message or a screen-off broadcast message, putting the new broadcast message into a first broadcast queue; when the new broadcast message is neither the screen-on broadcast message nor the screen-off broadcast message, and a number of receivers of the new broadcast message is greater than or equal to a preset receiving threshold, putting the new broadcast message into a second broadcast queue; when the new broadcast message is neither the screen-on broadcast message nor the screen-off broadcast message, and the number of receivers of the new broadcast message is less than the preset receiving threshold, and there is no service relationship between the new broadcast message and any broadcast message which has been in the second broadcast queue, putting the new broadcast message into a third broadcast queue; when the new broadcast message is neither the screen-on broadcast message nor the screen-off broadcast message, and there is a service relationship between the new broadcast message and a broadcast message which has been in the second broadcast queue, putting the new broadcast message into the second broadcast queue.

In an exemplary embodiment, putting a new broadcast message into one queue of the at least three broadcast queues according to a requirement for a response speed of each broadcast message and/or a service logic relationship between broadcast messages further includes: when the new broadcast message is neither the screen-on broadcast message nor the screen-off broadcast message, and a processing speed of a receiver of the new broadcast message is less than or equal to a preset processing threshold, putting the new broadcast message into the second broadcast queue; when the new broadcast message is neither the screen-on broadcast message nor the screen-off broadcast message, and the processing speed of the receiver of the new broadcast message is greater than the preset processing threshold, and there is no service relationship between the new broadcast message and any broadcast message which has been in the second broadcast queue, putting the new broadcast message into the third broadcast queue; when the new broadcast message is neither the screen-on broadcast message nor the screen-off broadcast message, and there is a service relationship between the new broadcast message and a broadcast messages which has been in the second broadcast queue, putting the new broadcast message into the second broadcast queue.

In an exemplary embodiment, the broadcast message put into the second broadcast queue includes a network state switching message.

In an exemplary embodiment, the network state switching message includes an ANDROID.net.conn.CONNECTIVIT-_CHANGE message.

In another aspect, an embodiment of the present disclosure further provides a broadcast message sending apparatus, including: a setting unit, configured to set at least three broadcast queues in a system; a putting unit, configured to put a new broadcast message into one queue of the at least three broadcast queues according to a requirement for a response speed of each broadcast message and/or a service logic relationship between broadcast messages; a sending unit, configured to send broadcast messages in respective queues through the at least three broadcast queues.

In an exemplary embodiment, the putting unit is configured to, when the new broadcast message is a screen-on broadcast message or a screen-off broadcast message, put the new broadcast message into a first broadcast queue; when the new broadcast message is neither the screen-on broadcast message nor the screen-off broadcast message, and a number of receivers of the new broadcast message is greater than or equal to a preset receiving threshold, put the new broadcast message into a second broadcast queue; when the new broadcast message is neither the screen-on broadcast message nor the screen-off broadcast message, and the number of receivers of the new broadcast message is less than the preset receiving threshold, and there is no service relationship between the new broadcast message and any broadcast message which has been in the second broadcast queue, put the new broadcast message into a third broadcast queue; when the new broadcast message is neither the screen-on broadcast message nor the screen-off broadcast message, and there is a service relationship between the new broadcast message and a broadcast message which has been in the second broadcast queue, put the new broadcast message into the second broadcast queue.

In an exemplary embodiment, the putting unit is further configured to, when the new broadcast message is neither the screen-on broadcast message nor the screen-off broadcast message, and a processing speed of a receiver of the new broadcast message is less than or equal to a preset processing threshold, put the new broadcast message into the second broadcast queue; when the new broadcast message is neither the screen-on broadcast message nor the screen-off broadcast message, and the processing speed of the receiver of the new broadcast message is greater than the preset processing threshold, and there is no service relationship between the new broadcast message and any broadcast message which has been in the second broadcast queue, put the new broadcast message into the third broadcast queue; when the new broadcast message is neither the screen-on broadcast message nor the screen-off broadcast message, and there is a service relationship between the new broadcast message and a broadcast message which has been in the second broadcast queue, put the new broadcast message into the second broadcast queue.

In an exemplary embodiment, the broadcast message put into the second broadcast queue includes a network state switching message.

In another aspect, an embodiment of the present disclosure further provides a mobile terminal, including any broadcast message sending apparatus provided by embodiments of the present disclosure.

An embodiment of the present disclosure further provides a computer-readable storage medium storing computer-executable instructions. When the computer-executable instructions are executed, the above broadcast message sending method is implemented.

According to the broadcast message sending method and apparatus, and the mobile terminal, provided by embodiments of the present disclosure, at least three broadcast queues are set in the system; and the new broadcast message is put into one queue of the at least three broadcast queues according to the requirement for the response speed of each broadcast message and/or the service logic relationship between broadcast messages; and then broadcast messages in respective queues are sent through the at least three broadcast queues. Thereby, through the at least three broadcast queues, a gradient can be formed for the sending time and waiting time of the broadcast messages, broadcast messages which have a requirement for a fast response speed are put into one queue, and services between broadcast messages are not affected and restricted with each other. Therefore, the efficiency of sending the broadcast messages is greatly increased, the lag phenomenon is efficiently avoided, and the user experience is greatly improved.

Other aspects will become apparent after reading and understanding the drawings and detailed description.

DETAILED DESCRIPTION

The present application will be described below in detail with reference to the accompanying drawings. It should be understood that the detailed embodiments herein are just used to explain the present application, and do not used to limit the present application.

Figure 1:
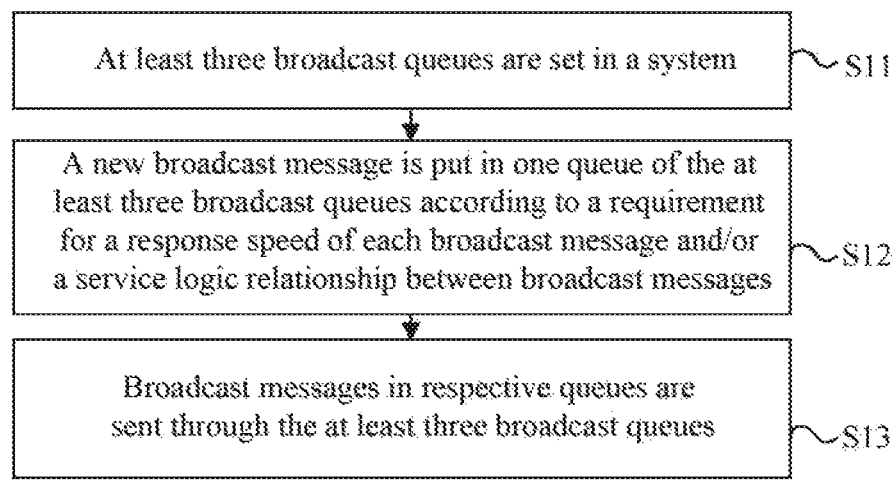
FIG. 1 is a flowchart of a broadcast message sending method provided by an embodiment of the present disclosure.

As shown FIG. 1, an embodiment of the present disclosure provides a broadcast message sending method, including the following steps 201-203.

In step S11, at least three broadcast queues are set in a system.

In step S12, a new broadcast message is put into one queue of the at least three broadcast queues according to a requirement for a response speed of each broadcast message and/or a service logic relationship between broadcast messages.

In step S13, broadcast messages in respective queues are sent through the at least three broadcast queues.

In the broadcast message sending method provided by an embodiment of the present disclosure, at least three broadcast queues are set in the system; and the new broadcast message is put into one queue of the at least three broadcast queues according to the requirement for the response speed of each broadcast message and/or the service logic relationship between broadcast messages; and then broadcast messages in respective queues are sent through the at least three broadcast queues. Thereby, through the at least three broadcast queues, a gradient can be formed for the sending time and the waiting time of the broadcast messages, broadcast messages which have a requirement for a fast response speed are put into one queue, and services between broadcast messages are not affected and restricted with each other. Therefore, the efficiency of sending the broadcast messages is greatly increased, the lag phenomenon is efficiently avoided, and the user experience is greatly improved.

In the step S11, the number of broadcast queues in the system may be determined according to the complexity degree of the system, the number of installed applications and so on. Generally, the higher the complexity degree of the system is, and the more the number of applications is, the more the number of the broadcast queues is. For example, in some embodiments, the number of the broadcast queues may be three to six.

In an exemplary embodiment, in the step S12, the step that a new broadcast message is put into one queue of the at least three broadcast queues according to a requirement for a response speed of each broadcast message and/or a service logic relationship between broadcast messages includes:

if the new broadcast message is a screen-on broadcast message or a screen-off broadcast message, the new broadcast message is put into a first broadcast queue;

if the new broadcast message is neither the screen-on broadcast message nor the screen-off broadcast message, and the number of receivers of the new broadcast message is greater than or equal to a preset receiving threshold, the new broadcast message is put into a second broadcast queue;

if the new broadcast message is neither the screen-on broadcast message nor the screen-off broadcast message, and the number of receivers of the new broadcast message is less than the preset receiving threshold, and there is no service relationship between the new broadcast message and any broadcast message which has been in the second broadcast queue, the new broadcast message is put into a third broadcast queue; if the new broadcast message is neither the screen-on broadcast message nor the screen-off broadcast message, and there is a service relationship between the new broadcast message and a broadcast messages which has been in the second broadcast queue, the new broadcast message is put into the second broadcast queue.

That is to say, a broadcast which is to be sent and responded as quickly as possible may be put into the first broadcast queue, such as a broadcast sent when the screen is on and a broadcast sent when the screen is off. In addition, to ensure that both screen-on and screen-off may be responded quickly in time in any situation, in an exemplary embodiment, there may be the only two broadcast messages stored in the first broadcast queue. For other types of broadcast messages, new broadcast messages may be put into the other two broadcast queues according to a requirement for a response speed of each broadcast message and/or a service logic relationship between broadcast messages.

Specifically, in one broadcast queue, a broadcast message is sent to the next receiver only after the broadcast message is sent to a receiver and a corresponding feedback is received. Thus, a factor influencing whether broadcast messages in the queue are overstocked may include the number of receivers of each broadcast message, a message processing speed of each receiver, and the complexity degree of the message itself, and so on. In the present embodiment, when a new broadcast message is generated, at first taking the number of receivers of the new broadcast message as a measurement, the new broadcast message is determined to be put into which broadcast queue. If the new broadcast message is neither the screen-on broadcast message nor the screen-off broadcast message, and the number of receivers of the new broadcast message is greater than or equal to the preset receiving threshold, it shows that the number of receivers of the new broadcast message is relatively large, and a longer time is to be spent to finish the sending of the broadcast message. In order to not block the sending of other broadcast messages, the broadcast message and other broadcast messages may be stored separately in different broadcast queues, for example, the broadcast message may be put into the second broadcast queue.

In an exemplary embodiment, if the new broadcast message is neither the screen-on broadcast message nor the screen-off broadcast message, and the number of receivers of the new broadcast message is less than the preset receiving threshold, and there is no service relationship between the new broadcast message and any broadcast message which has been in the second broadcast queue, the new broadcast message may be put into the third broadcast queue. If the new broadcast message is neither the screen-on broadcast message nor the screen-off broadcast message, and the new broadcast message does not meet the above condition for putting into the third broadcast queue, then the new broadcast message is put into the second broadcast queue.

In an exemplary embodiment, the broadcast message put into the second broadcast queue includes a network state switching message. Taking an example for illustration, in an embodiment, since many applications may be accessed to the Internet, these applications all are registered to receive the network state switching message. In an exemplary embodiment, the network state switching message may include an ANDROID.net.conn.CONNECTIVIT-_CHANGE message or the like. If the network state switching message is put into the second broadcast queue, then a web promotion message of each application subsequently is also put into the second broadcast queue since there is a service relationship with the network state switching message. However, but the messages, such as, a short message, a calling, a local small application and so on, are put into the third broadcast queue since there is no service relationship with the network state switching message. Thereby, these broadcast messages which have no service relationship with the network state switching message may be sent directly in the third broadcast queue, without waiting for the accomplishment of the broadcasting of the network state switching message. Therefore, the performance of the terminal processing the broadcast message is efficiently enhanced, the delay sending of the broadcast message is avoided, and the user experience is greatly improved.

In an exemplary embodiment, besides determining that the new broadcast message is put into which broadcast queue according to the number of receivers of the new broadcast message, how to put the broadcast message may be also determined according to the processing speed of a receiver of the new broadcast message. For example, if the new broadcast message is neither the screen-on broadcast message nor the screen-off broadcast message, and a processing speed of a receiver of the new broadcast message is less than or equal to a preset processing threshold, then the new broadcast message is put into the second broadcast queue. If the new broadcast message is neither the screen-on broadcast message nor the screen-off broadcast message, and the processing speed of the receiver of the new broadcast message is greater than the preset processing threshold, and there is no service relationship between the new broadcast message and any broadcast message which has been in the second broadcast queue, then the new broadcast message is put into the third broadcast queue. Otherwise, the new broadcast message is put into the second broadcast queue. That is, if the new broadcast message is neither the screen-on broadcast message nor the screen-off broadcast message, and the new broadcast message does not meet the above condition of putting into the third broadcast queue, then the new broadcast message is put into the second broadcast queue.

In other words, at first, a broadcast message corresponding to a receiver with a low processing speed is put into the second broadcast queue, and then a broadcast message which has a service relationship with the broadcast message corresponding to a receiver with a low processing speed is also put into the second broadcast queue, and a broadcast message which has no service relationship is put into the third broadcast queue. Thereby a broadcast message in the third broadcast queue can be sent at a faster speed, lag and delay of the system are avoided.

Figure 2:
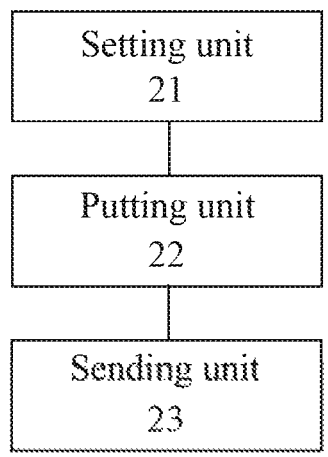
FIG. 2 is a structural diagram of a broadcast message sending apparatus provided by an embodiment of the present disclosure.

As shown FIG. 2, an embodiment of the present disclosure provides a broadcast message sending apparatus, including a setting unit 21, a putting unit 22 and a sending unit 23.

The setting unit 21 is configured to set at least three broadcast queues in a system.

The putting unit 22 is configured to put a new broadcast message into one queue of the at least three broadcast queues according to a requirement for a response speed of each broadcast message and/or a service logic relationship between broadcast messages.

The sending unit 23 is configured to send broadcast messages in respective queues through the at least three broadcast queues.

In a broadcast message sending apparatus provided by an embodiment of the present disclosure, the setting unit 21 may set at least three broadcast queues in the system; and the putting unit 22 may put the new broadcast message into one queue of the at least three broadcast queues according to the requirement for the response speed of each broadcast message and/or the service logic relationship between broadcast messages; and the sending unit 23 may send broadcast messages in respective queues through the at least three broadcast queues. Thereby, through the at least three broadcast queues, a gradient can be formed for the sending time and the waiting time of the broadcast messages, broadcast messages which have a requirement for a fast response speed are put into one queue, and services between broadcast messages are not affected and restricted with each other. Therefore, the efficiency of sending the broadcast messages is greatly increased, the lag phenomenon is efficiently avoided, and the user experience is greatly improved.

In an exemplary embodiment, the putting unit 22 is configured to:

if the new broadcast message is neither a screen-on broadcast message nor a screen-off broadcast message, and the broadcast message is a screen-on broadcast message or a screen-off broadcast message, put the new broadcast message into a first broadcast queue;

if the new broadcast message is neither the screen-on broadcast message nor the screen-off broadcast message, and a number of receivers of the new broadcast message is greater than or equal to a preset receiving threshold, put the new broadcast message into a second broadcast queue;

if the new broadcast message is neither the screen-on broadcast message nor the screen-off broadcast message, and the number of receivers of the new broadcast message is less than the preset receiving threshold, and there is no service relationship between the new broadcast message and any broadcast message which has been in the second broadcast queue, put the new broadcast message into a third broadcast queue; otherwise, put the new broadcast message into the second broadcast queue. That is to say, if the new broadcast message is neither the screen-on broadcast message nor the screen-off broadcast message, and the new broadcast message does not meet the above condition of putting into the third broadcast queue, the new broadcast message is put into the second broadcast queue.

In an exemplary embodiment, the putting unit 22 is further configured to:

if the new broadcast message is neither the screen-on broadcast message nor the screen-off broadcast message, and a processing speed of a receiver of the new broadcast message is less than or equal to a preset processing threshold, put the new broadcast message into the second broadcast queue;

if the new broadcast message is neither the screen-on broadcast message nor the screen-off broadcast message, and the processing speed of the receiver of the new broadcast message is greater than the preset processing threshold, and there is no service relationship between the new broadcast message and any broadcast message which has been in the second broadcast queue, put the new broadcast message into the third broadcast queue; otherwise, put the new broadcast message into the second broadcast queue. That is to say, if the new broadcast message is neither the screen-on broadcast message nor the screen-off broadcast message, and the new broadcast message does not meet the above condition of putting into the third broadcast queue, the new broadcast message is put into the second broadcast queue.

In an exemplary embodiment, the broadcast message put into the second broadcast queue includes a network state switching message.

An embodiment of the present disclosure further provides a mobile terminal. Since any broadcast message sending apparatus provided by the above embodiments is provided at the mobile terminal, the corresponding beneficial technology effect can be achieved, which has been described above in detail, and is not repeated here.

An embodiment of the present disclosure further provides a computer-readable storage medium storing computer-executable instructions. When the computer-executable instructions are executed, the above broadcast message sending method is implemented.

Those of ordinary skill in the art can understand that all or part of the steps in the above method may be implemented by a program instructing related hardware (e.g., a processor), and the program may be stored in a computer-readable storage medium, such as a read-only memory, a magnetic disk, or a compact disk or the like. Alternatively, all or part of the steps of the above embodiments may also be implemented using one or more integrated circuits. Correspondingly, each module/unit in the above embodiments may be implemented in the form of hardware, for example, an integrated circuit is used to achieve corresponding functions. Or, each module/unit in the above embodiments may be implemented in the form of software function module, for example, a processor executes a program/instruction stored in a storage to achieve corresponding functions. The present application is not limited to any specific form of combination of hardware and software.

Though alternative embodiments of the present application are disclosed for the aim of illustration, those of skill in the art should understand that various modifications, additions and replacements of the above embodiments may also be possible, so the scope of the present application should not be limited to the above embodiments.

INDUSTRIAL APPLICABILITY

Embodiments of the present disclosure provide a broadcast message sending method and apparatus, and through the at least three broadcast queues, a gradient can be formed for the sending time and waiting time of the broadcast messages, broadcast messages which have a requirement for a fast response speed are put into one queue, and services between broadcast messages are not affected and restricted with each other. Therefore, the efficiency of sending the broadcast messages is greatly increased, the lag phenomenon is efficiently avoided, and the user experience is greatly improved.

What is claimed is:

1. A broadcast message sending method, comprising:
setting at least three broadcast queues in a system;
putting a new broadcast message into one queue of the at least three broadcast queues according to at least one of a requirement for a response speed of each broadcast message or a service logic relationship between broadcast messages; and
sending broadcast messages in respective queues through the at least three broadcast queues;
wherein, putting the new broadcast message into the one queue of the at least three broadcast queues according to the at least one of the requirement for the response speed of each broadcast message or the service logic relationship between broadcast messages comprises:
when the new broadcast message is a screen-on broadcast message or a screen-off broadcast message, putting the new broadcast message into a first broadcast queue; or
when the new broadcast message is neither the screen-on broadcast message nor the screen-off broadcast message, putting the new broadcast message into the one queue of the at least three broadcast queues according to one of the following:
a number of receivers of the new broadcast message;
a number of receivers of the new broadcast message, and the service logic relationship between broadcast messages;
a processing speed of a receiver of the new broadcast message; or
a processing speed of a receiver of the new broadcast message, and the service logic relationship between broadcast messages.

2. The method according to claim 1, wherein, when the new broadcast message is neither the screen-on broadcast message nor the screen-off broadcast message, putting the new broadcast message into the one queue of the at least three broadcast queues according to one of the following: a number of receivers of the new broadcast message; a number of receivers of the new broadcast message, and the service logic relationship between broadcast messages; a processing speed of a receiver of the new broadcast message; or a processing speed of a receiver of the new broadcast message, and the service logic relationship between broadcast messages, comprises:
when the new broadcast message is neither the screen-on broadcast message nor the screen-off broadcast message, and the number of the receivers of the new broadcast message is greater than or equal to a preset receiving threshold, putting the new broadcast message into a second broadcast queue;
when the new broadcast message is neither the screen-on broadcast message nor the screen-off broadcast message, and the number of receivers of the new broadcast message is less than the preset receiving threshold, and there is no service relationship between the new broadcast message and any broadcast message which has been in the second broadcast queue, putting the new broadcast message into a third broadcast queue; when the new broadcast message is neither the screen-on broadcast message nor the screen-off broadcast message, and there is a service relationship between the new broadcast message and a broadcast message which has been in the second broadcast queue, putting the new broadcast message into the second broadcast queue.

3. The method according to claim 1, wherein when the new broadcast message is neither the screen-on broadcast message nor the screen-off broadcast message, putting the new broadcast message into the one queue of the at least three broadcast queues according to one of the following: a number of receivers of the new broadcast message; a number of receivers of the new broadcast message, and the service logic relationship between broadcast messages; a processing speed of a receiver of the new broadcast message; or a processing speed of a receiver of the new broadcast message, and the service logic relationship between broadcast messages, comprises:
when the new broadcast message is neither the screen-on broadcast message nor the screen-off broadcast message, and the processing speed of the receiver of the new broadcast message is less than or equal to a preset processing threshold, putting the new broadcast message into the second broadcast queue;
when the new broadcast message is neither the screen-on broadcast message nor the screen-off broadcast message, and the processing speed of the receiver of the new broadcast message is greater than the preset processing threshold, and there is no service relationship between the new broadcast message and any broadcast message which has been in the second broadcast queue, putting the new broadcast message into the third broadcast queue; when the new broadcast message is neither the screen-on broadcast message nor the screen-off broadcast message, and there is a service relationship between the new broadcast message and a broadcast message which has been in the second broadcast queue, putting the new broadcast message into the second broadcast queue.

4. The method according to claim 2, wherein the broadcast message put into the second broadcast queue comprises a network state switching message.

5. The method according to claim 4, wherein the network state switching message comprises an ANDROID.net.conn.CONNECTIVIT_CHANGE message.

6. The method according to claim 1, a number of the at least three broadcast queues is determined according to a complexity degree of the system, or a number of installed applications.

7. A broadcast message sending apparatus, comprising a processor and a computer-readable storage medium for storing instructions which, when executed by the processor, cause the processor to perform the following steps:
setting at least three broadcast queues in a system;
putting a new broadcast message into one queue of the at least three broadcast queues according to at least one of a requirement for a response speed of each broadcast message and/or a service logic relationship between broadcast messages; and
sending broadcast messages in respective queues through the at least three broadcast queues;
wherein, putting the new broadcast message into the one queue of the at least three broadcast queues according to the at least one of the requirement for the response speed of each broadcast message or the service logic relationship between broadcast messages comprises:
when the new broadcast message is a screen-on broadcast message or a screen-off broadcast message, putting the new broadcast message into a first broadcast queue; or
when the new broadcast message is neither the screen-on broadcast message nor the screen-off broadcast message, putting the new broadcast message into one queue of the at least three broadcast queues according to one of the following:

a number of receivers of the new broadcast message;
a number of receivers of the new broadcast message, and the service logic relationship between broadcast messages;
a processing speed of a receiver of the new broadcast message; or
a processing speed of a receiver of the new broadcast message, and the service logic relationship between broadcast messages.

8. The apparatus according to claim 7, wherein when the new broadcast message is neither the screen-on broadcast message nor the screen-off broadcast message, putting the new broadcast message into the one queue of the at least three broadcast queues according to one of the following: a number of receivers of the new broadcast message; a number of receivers of the new broadcast message, and the service logic relationship between broadcast messages; a processing speed of a receiver of the new broadcast message; or a processing speed of a receiver of the new broadcast message, and the service logic relationship between broadcast messages, comprises:
when the new broadcast message is neither the screen-on broadcast message nor the screen-off broadcast message, and the number of the receivers of the new broadcast message is greater than or equal to a preset receiving threshold, putting the new broadcast message into a second broadcast queue;
when the new broadcast message is neither the screen-on broadcast message nor the screen-off broadcast message, and the number of receivers of the new broadcast message is less than the preset receiving threshold, and there is no service relationship between the new broadcast message and any broadcast message which has been in the second broadcast queue, putting the new broadcast message into a third broadcast queue; when the new broadcast message is neither the screen-on broadcast message nor the screen-off broadcast message, and there is a service relationship between the new broadcast message and a broadcast messages which has been in the second broadcast queue, putting the new broadcast message into the second broadcast queue.

9. The apparatus according to claim 7, wherein when the new broadcast message is neither the screen-on broadcast message nor the screen-off broadcast message, putting the new broadcast message into the one queue of the at least three broadcast queues according to one of the following: a number of receivers of the new broadcast message; a number of receivers of the new broadcast message, and the service logic relationship between broadcast messages; a processing speed of a receiver of the new broadcast message; or a processing speed of a receiver of the new broadcast message, and the service logic relationship between broadcast messages, comprises:
when the new broadcast message is neither the screen-on broadcast message nor the screen-off broadcast message, and the processing speed of the receiver of the new broadcast message is less than or equal to a preset processing threshold, putting the new broadcast message into the second broadcast queue;
when the new broadcast message is neither the screen-on broadcast message nor the screen-off broadcast message, and the processing speed of the receiver of the new broadcast message is greater than the preset processing threshold, and there is no service relationship between the new broadcast message and any broadcast message which has been in the second broadcast queue, putting the new broadcast message into the third broadcast queue; when the new broadcast message is neither the screen-on broadcast message nor the screen-off broadcast message, and there is a service relationship between the new broadcast message and a broadcast message which has been in the second broadcast queue, putting the new broadcast message into the second broadcast queue.

10. The apparatus according to claim 8, wherein the broadcast message put into the second broadcast queue comprises a network state switching message.

11. The apparatus according to claim 7, wherein a number of the at least three broadcast queues is determined according to a complexity degree of the system, or a number of installed applications.

12. A non-transitory computer-readable storage medium, storing instructions which, when executed by a processor, cause the processor to perform a method comprising:
setting at least three broadcast queues in a system;
putting a new broadcast message into one queue of the at least three broadcast queues according to at least one of a requirement for a response speed of each broadcast message or a service logic relationship between broadcast messages; and
sending broadcast messages in respective queues through the at least three broadcast queues;
wherein, putting the new broadcast message into the one queue of the at least three broadcast queues according to the at least one of the requirement for the response speed of each broadcast message or the service logic relationship between broadcast messages comprises:
when the new broadcast message is a screen-on broadcast message or a screen-off broadcast message, putting the new broadcast message into a first broadcast queue; or
when the new broadcast message is neither the screen-on broadcast message nor the screen-off broadcast message, putting the new broadcast message into the one queue of the at least three broadcast queues according to one of the following:
a number of receivers of the new broadcast message;
a number of receivers of the new broadcast message, and the service logic relationship between broadcast messages;
a processing speed of a receiver of the new broadcast message; or
a processing speed of a receiver of the new broadcast message, and the service logic relationship between broadcast messages.

* * * * *